(12) United States Patent
Thurfjell et al.

(10) Patent No.: US 9,848,428 B2
(45) Date of Patent: Dec. 19, 2017

(54) POSITIONING OF WIRELESS DEVICES

(71) Applicant: Telefonaktiebolaget LM Ericsson (publ), Stockholm (SE)

(72) Inventors: Magnus Thurfjell, Luleå (SE); Kjell Larsson, Luleå (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/913,544

(22) PCT Filed: Aug. 27, 2013

(86) PCT No.: PCT/SE2013/050999
§ 371 (c)(1),
(2) Date: Feb. 22, 2016

(87) PCT Pub. No.: WO2015/030638
PCT Pub. Date: Mar. 5, 2015

(65) Prior Publication Data
US 2016/0212738 A1    Jul. 21, 2016

(51) Int. Cl.
*H04W 72/04* (2009.01)
*H04L 25/03* (2006.01)
(Continued)

(52) U.S. Cl.
CPC ............ *H04W 72/048* (2013.01); *G01S 1/44* (2013.01); *G01S 3/38* (2013.01); *G01S 5/12* (2013.01);
(Continued)

(58) Field of Classification Search
None
See application file for complete search history.

(56) References Cited

U.S. PATENT DOCUMENTS

2005/0156780 A1*  7/2005  Bonthron ............... G01S 3/48
                                                     342/107
2006/0023653 A1*  2/2006  Montalbano ........ H04L 25/0232
                                                     370/315
(Continued)

FOREIGN PATENT DOCUMENTS

EP              1 892 850 A2      2/2008
WO       WO 2007/095354 A2        8/2007
(Continued)

OTHER PUBLICATIONS

PCT Notification of Transmittal of the International Search Report and the Written Opinion of the International Searching Authority, or the Declaration for International application No. PCT/SE2013/050999, dated May 23, 2014.
(Continued)

*Primary Examiner* — Jenee Holland
(74) *Attorney, Agent, or Firm* — Baker Botts, LLP

(57) ABSTRACT

A method performed by a network node (10) for finding a direction to a wireless device (20) in a wireless communication network is provided. The method comprises the step (S1) of the network node transmitting reference signal pairs on at least one pair of correlated antennas. Each reference signal pair has a unique phase difference between the signals in the signal pair, and the unique phase differences of the reference signal pairs are distributed over a given angular interval. The method further comprises the step (S2) of the network node receiving from the wireless device, in response to each pair of reference signals, a respective indication of a preferred pre-coding matrix, and the step (S3) of the network node determining a direction to the wireless device based on the received indications, information representative of the phase differences of the reference signal
(Continued)

pairs, and phase information related to the indicated preferred pre-coding matrices.

18 Claims, 6 Drawing Sheets

(51) Int. Cl.
  H04W 64/00   (2009.01)
  G01S 1/44   (2006.01)
  G01S 3/38   (2006.01)
  G01S 5/12   (2006.01)
  G01S 7/06   (2006.01)
  H04B 7/0408  (2017.01)
  H04B 7/0456  (2017.01)
  H04B 7/06   (2006.01)
  H04B 7/04   (2017.01)
  H04L 5/00   (2006.01)

(52) U.S. Cl.
  CPC .......... *H04B 7/046* (2013.01); *H04B 7/0408* (2013.01); *H04B 7/0456* (2013.01); *H04B 7/0617* (2013.01); *H04B 7/0639* (2013.01); *H04L 5/0051* (2013.01); *H04L 25/03* (2013.01); *H04L 25/03949* (2013.01); *H04W 64/00* (2013.01)

(56) References Cited

U.S. PATENT DOCUMENTS

| | | | | |
|---|---|---|---|---|
| 2008/0100510 A1* | 5/2008 | Bonthron | ............ | G01S 7/024 342/373 |
| 2008/0186212 A1* | 8/2008 | Clerckx | ............ | H04B 7/0456 341/55 |
| 2010/0020709 A1* | 1/2010 | Ohm | ............ | H04B 7/0417 370/252 |
| 2010/0033374 A1* | 2/2010 | van Rensburg | ........ | H01Q 1/246 342/368 |
| 2010/0091893 A1* | 4/2010 | Gorokhov | ............ | H04L 1/0026 375/260 |
| 2010/0123616 A1* | 5/2010 | Minami | ............ | G01S 7/4021 342/147 |
| 2010/0246494 A1* | 9/2010 | Sanayei | ............ | H04B 7/0417 370/328 |
| 2011/0249588 A1* | 10/2011 | Petersson | ............ | H04B 7/0417 370/252 |
| 2011/0273991 A1* | 11/2011 | Dahl | ............ | G01S 5/0205 370/241 |
| 2011/0274169 A1* | 11/2011 | Paz | ............ | H04N 19/176 375/240.13 |
| 2012/0300867 A1* | 11/2012 | Chen | ............ | H04B 7/0456 375/267 |
| 2013/0064317 A1* | 3/2013 | Tong | ............ | H04B 7/0469 375/267 |
| 2014/0029684 A1* | 1/2014 | Shirani-Mehr | ....... | H04B 7/0469 375/267 |
| 2016/0050003 A1* | 2/2016 | Ko | ............ | H04B 7/0469 370/329 |

FOREIGN PATENT DOCUMENTS

| | | |
|---|---|---|
| WO | WO 2010/069610 A1 | 6/2010 |
| WO | WO 2010/087749 A1 | 8/2010 |
| WO | WO 2013/119152 A1 | 8/2013 |

OTHER PUBLICATIONS

"Distance-Measurement Error Associated with Antenna Phase-Center Displacement in Time-Reference Radio Positioning Systems" by Steven R. Best; IEEE Antennas and Propagation Magazine, vol. 46, No. 2, Apr. 2004.

* cited by examiner

POSITIONING OF WIRELESS DEVICES

PRIORITY

This nonprovisional application is a U.S. National Stage Filing under 35 U.S.C. §371 of International Patent Application Serial No. PCT/SE2013/050999, filed Aug. 27, 2013, and entitled "Positioning Of Wireless Devices."

TECHNICAL FIELD

The present embodiments generally relate to wireless communications and, more particularly, to a method and network node for finding a direction to a wireless device in a wireless communication network.

BACKGROUND

Positioning of mobile devices in wireless networks is a challenge owing to the mobility of users and the dynamic nature of both the environments and radio signals. Positioning Quality of Services (QoS) is typically defined in 'terms of accuracy, confidence level and the time it takes to obtain a positioning result. The current trend shows that the demands from users, network operators, service providers and regulatory bodies regarding positioning QoS are increasing.

In outdoor environments, position estimation can be done using e.g. global positioning systems, i.e. GNSS/GPS (Global Navigation Satellite System/Global Positioning System), or methods based thereon, such as Assisted-GPS (A-GPS). However, this requires that the user equipment (UE) is provided with additional functionality concerning e.g. reception of radio signals related to such positioning systems.

Position estimation can also be performed using the wireless network itself. Methods using the wireless network can be grouped in different groups. A first group comprises methods that are based on the identification of the radio cell to which a mobile terminal is connected, e.g. by using Cell ID (CID). In its simplest form, a UE is known to be situated within the coverage area of a certain base station if the UE is communicating with the wireless network through that base station. The accuracy can be improved by also taking into account information from so-called neighbor lists. However, the accuracy is even then not very impressive.

Another group of position estimation methods are based on measurements of signal propagation times or quantities related thereto. Timing Advance (TA) in Long Term Evolution (LTE) systems and Round Trip Time (RTT) in Wideband Code Division Multiple Access (WCDMA) systems are examples of such methods. Briefly, the travel time of radio waves from the Radio Base Station (RBS) to the UE and back is measured. By combining such information with propagation times to neighboring RBS's enabling triangulation calculations, the accuracy can be improved somewhat. However, this possibility only occurs in a limited part of the cells, typically less than 25%. The signal propagation time measurements can also be combined with Cell ID information. As for other terrestrial positioning methods, like Observed Time Difference of Arrival (OTDOA), these suffer from a too low detection performance to provide good enough performance, at least in the basic configuration.

Thus, there is a need for fast and reasonable accurate user device positioning algorithms in cellular mobile systems. Such algorithms should be non-GNSS/GPS based, preferably non-UE controlled and handled and processed in/by the network (i.e. by one or several evolved Node B (eNodeB)/radio base stations (RBS)), have a quick response time, meaning not requiring time consuming data processing, and provide a user location precision beneficial for typical positioning use cases (i.e. <<100 m).

A brief overview of existing positioning solutions shows a limited number of, or in fact, very few solutions capable of providing sufficient resolution.

CID—Cell ID: Position is determined from serving cell location.

E-CID—Enhanced Cell ID: Include information of timing advance (i.e. distance), possibly multiple cells, etc.

AoA—Angle of Arrival: Estimates the direction from the site to the mobile.

OTDOA/UTDOA—Observed/Uplink Time Difference of Arrival: Uses timing information from several cells to triangulate user positions.

Fingerprinting: Mapping radio frequency (RF) measurements onto an RF map based on predictions and/or controlled measurements.

A-GNSS—Assisted GNSS, e.g. GPS, GLONASS (Globalnaya Navigatsionnaya Sputnikova Sistema) and Galileo: Based on time differences in propagation from >3 satellites; requires more or less line-of-sight (LOS) to satellites.

Hybrid solutions: Combination of several methods.

Problems with Existing Solutions

As accuracy demands increase the response time and computational complexity increases correspondingly, while offline processing is not desired. Methods as CID, E-CID and AoA can be used in most cellular systems. However, for simple and straightforward solutions such as CID, the method error can be rather large.

Inherent time resolution (e.g. slot length) makes "Observed Time Difference of Arrival"-based (OTDOA) approaches troublesome; typical resolution is 100 meters.

State of the art eNodeB/RBS based positioning solutions are not accurate enough for typical use cases where 20-30 m accuracy for UE positions is desired.

Signal "triangulation" from several base stations provides UE position only in border areas. Thus, with no positioning near base station sites, such approach is less useful.

Signal from own RBS+AoA (+antenna diagram lookup) has a serious showstopper in today's limitation in UE neighbor Reference Signal Received Power (RSRP) detection range (typically 6 dB). A signal strength+AoA-approach might work using ideal high-resolution data (i.e. non-UE, e.g. scanner range) but will likely not work in practice with data from today's $3^{rd}$ Generation Partnership Project (3GPP) compliant UEs.

Thus, there is a need for a method and a device further improving the positioning accuracy.

SUMMARY

It is an object to provide a method and a network node for finding a direction to a wireless device in a wireless communication network.

These and other objects are met by the disclosed embodiments as defined by the accompanying patent claims.

An aspect relates to a method performed by a network node for finding a direction to a wireless device in a wireless communication network. A set of predefined precoders usable by the network node for user communication is known by both the network node and the wireless device, and each precoder is defined by an individual pre-coding matrix. The method comprises the step of the network node transmitting a plurality of pairs of reference signals on at least one pair of correlated antennas, each pair of correlated antennas comprising a first and a second antenna, and each pair of reference signals comprising a first and a second reference signal and having its own unique phase difference between the first and the second reference signal. The first reference signal is transmitted on the first antenna and the second reference signal is transmitted on the second antenna, wherein the unique phase differences of the plurality of pairs of reference signals are distributed over a given angular interval. The method further comprises the step of the network node receiving from the wireless device, in response to each pair of reference signals transmitted with its own unique phase difference, a respective indication of a preferred pre-coding matrix. The method also comprises the step of the network node determining a direction to the wireless device based on the received indications, information representative of at least part of the phase differences of the plurality of pairs of reference signals, and precoder-related phase information representative of differences in phase between the antennas for at least part of the indicated preferred pre-coding matrices.

Another aspect relates to a network node configured to find a direction to a wireless device in a wireless communication network. A set of predefined precoders usable by the network node for user communication is known by both the network node and the wireless device, and each precoder is defined by an individual pre-coding matrix. The network node comprises a transmitter configured to transmit a plurality of pairs of reference signals on at least one pair of correlated antennas, each pair of correlated antennas comprising a first and a second antenna, and each pair of reference signals comprising a first and a second reference signal and having its own unique phase difference between the first and the second reference signal. The first reference signal is transmitted on the first antenna and the second reference signal is transmitted on the second antenna, wherein the unique phase differences of the plurality of pairs of reference signals are distributed over a given angular interval. The network node further comprises a receiver configured to receive from the wireless device, in response to each pair of reference signals transmitted with its own unique phase difference, a respective indication of a preferred pre-coding matrix. The network node also comprises a calculator configured to determine a direction to the wireless device based on the received indications, information representative of at least part of the phase differences of the plurality of pairs of reference signals and precoder-related phase information representative of differences in phase between the antennas for at least part of the indicated preferred pre-coding matrices.

The disclosed embodiments provide improved accuracy for positioning of wireless devices, with a fast calculation scheme and without impact on the wireless devices.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The present embodiments generally relate to wireless communications and, more particularly, to a method and network node for finding a direction to a wireless device in a wireless communication network.

Throughout the drawings, the same reference numbers are used for similar or corresponding elements.

As described in the background section, it is desirable to provide improvements related to user device positioning algorithms in cellular mobile systems. The embodiments described herein propose a method and a network node for finding a direction to, and optionally a position of, a wireless device in a wireless communication network.

Figure 1:
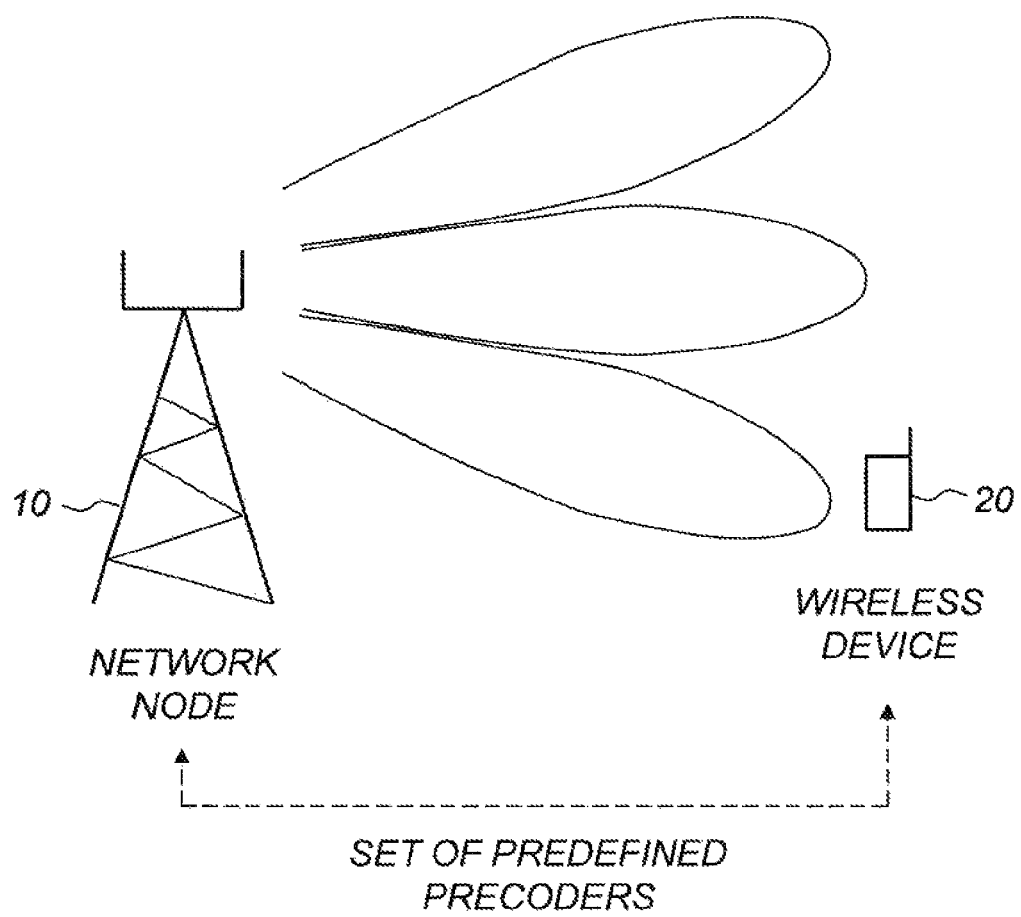
FIG. 1 is a schematic diagram illustrating an example of a network node and a wireless device in a wireless communication network.

FIG. 1 is a schematic diagram illustrating an example of a network node 10 and a wireless device 20 in a wireless communication network, with a pair of correlated transmit antenna elements at the network node. Correlated antenna pairs have beam forming properties with beam directions dependent on the phase difference between transmissions from the antenna elements. For a single pair of correlated antennas, such as e.g. antenna 1 and 2 in FIG. 2, the main lobe or beam during transmission is pointing in the direction where the phases of the antenna signals are added constructively. By changing the phase e.g. of the signal emitted from one of the antennas in the pair, the main lobe direction will change. Some examples of different main lobe directions are illustrated in FIG. 1.

Figure 3:
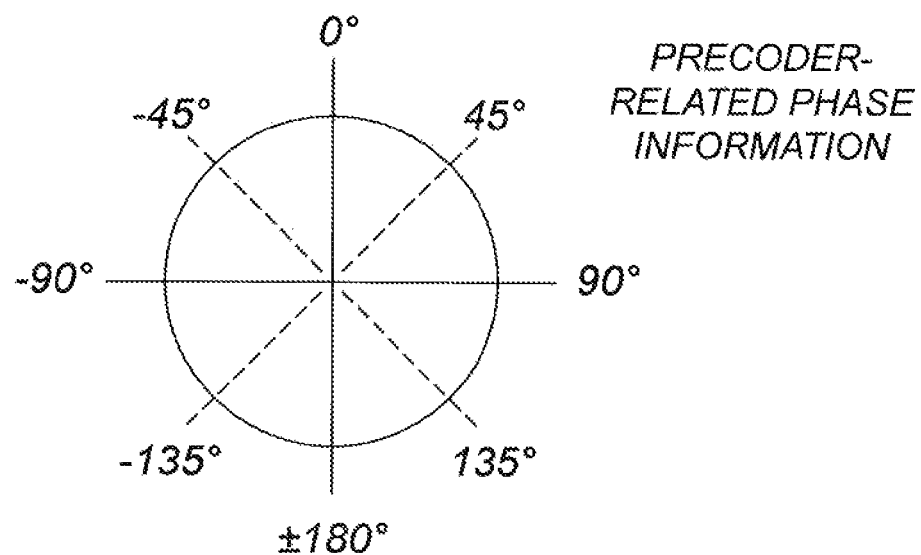
FIG. 3 is an example of precoder-related phase information according to an embodiment.

Transmitting the same signals modified by a precoder on two correlated antennas generates a beam in a direction defined by the difference between the phases of the precoder. In general terms, a precoder defines a phase and amplitude per antenna that is modifying the transmitted signal before transmission. In this scope however, only the phase modifying part is relevant. Phase information related to the properties of a precoder will be referred to as "precoder-related phase information" in this description. FIG. 3 illustrates an example of such precoder-related phase information, where some values of phase difference are shown.

The direction to a wireless device can be estimated by evaluating the preferred precoder that the wireless device reports as a response to the transmitted signals. However, if the precoder set is limited, which is often the case, estimation may generally be too inaccurate.

Figure 4:
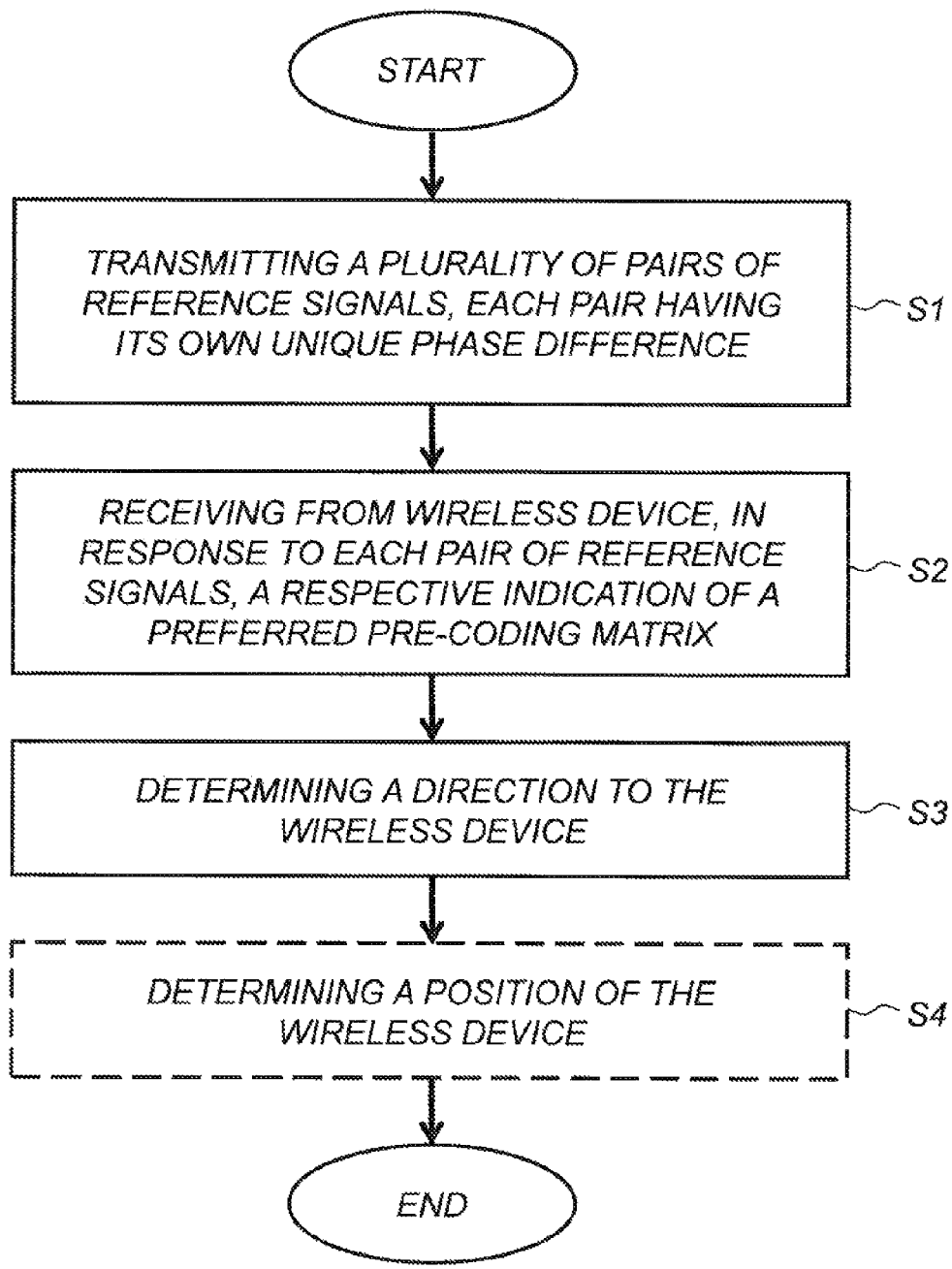
FIG. 4 is a flow chart showing an example of a method for determining a direction to, and optionally a position of, a wireless device in a wireless communication network according to an embodiment.

The proposed method improves the angular accuracy by introducing an additional phase difference between the correlated antennas. As schematically illustrated in FIG. 4, there is provided a method performed by a network node for finding a direction to a wireless device in a wireless communication network. A set of predefined precoders usable by the network node for user communication is known by both the network node and the wireless device, and each precoder is defined by an individual pre-coding matrix. The method comprises the step S1 of the network node transmitting a plurality of pairs of reference signals on at least one pair of correlated antennas, each pair of correlated antennas comprising a first and a second antenna, and each pair of reference signals comprising a first and a second reference signal and having its own unique phase difference between the first and the second reference signal. The first reference signal is transmitted on the first antenna and the second reference signal is transmitted on the second antenna, wherein the unique phase differences of the plurality of pairs of reference signals are distributed over a given angular interval.

The method illustrated in FIG. 4 further comprises the step S2 of the network node receiving from the wireless device, in response to each pair of reference signals transmitted with its own unique phase difference, a respective indication of a preferred pre-coding matrix.

The method illustrated in FIG. 4 also comprises the step S3 of the network node determining a direction to the wireless device based on the received indications, information representative of at least part of the phase differences of the plurality of pairs of reference signals, and precoder-related phase information representative of differences in phase between the antennas for at least part of the indicated preferred pre-coding matrices.

In other words, a basic concept of the described embodiment is based on a network node transmitting pairs of reference signals with specific phase differences on one or more pairs of correlated antennas. A wireless device reports indications of a preferred precoder or pre-coding matrix (PMI), chosen from a predefined set of precoders, to the network node, in response to the transmitted reference signals. The direction to the wireless device is then calculated based on an analysis of the phase information related to the different preferred precoders and the corresponding phase differences of the transmitted reference signals.

In a preferred embodiment of the method, a set of precoders usable by the network node for user communication is predefined and known by both the network node and the wireless device, which is illustrated by the dashed line in FIG. 1. Furthermore, the wireless device, e.g. a UE, should preferably be able to detect that a reference signal belongs to a specific individual antenna.

The proposed method for direction finding/positioning requires at least one pair of correlated transmit antenna elements at the network node. Preferably, the antenna elements of each correlated antenna pair should have calibrated phases, or the phase errors between the antenna elements should be known.

Figure 2:
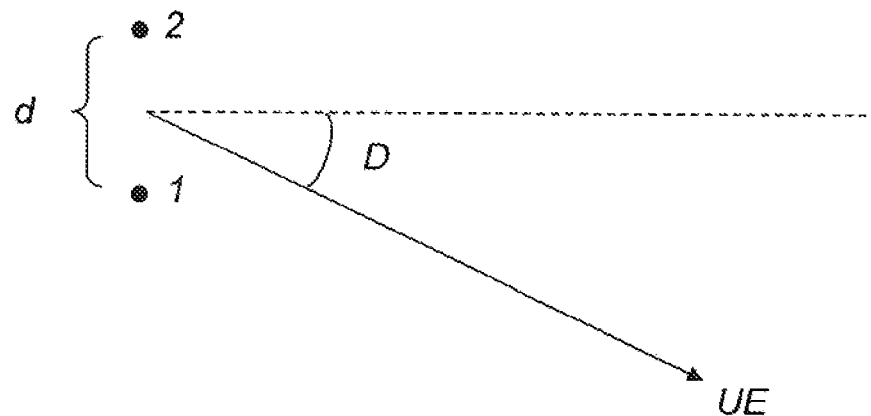
FIG. 2 is a schematic diagram illustrating an example of a pair of correlated antennas and a wireless device in a communication network.

Although FIG. 2 shows only one pair of correlated antennas, the proposed method can also be implemented for more than one correlated antenna pair. Note that each correlated antenna pair will then transmit a plurality of reference signals pairs, where each reference signal pair has a unique phase difference. When transmitting the reference signal pairs on the correlated antenna pairs, each respective antenna pair may in one example embodiment transmit the same sequence of reference signal pairs as the other antenna pairs, or in another embodiment each respective antenna pair may transmit a plurality of reference signal pairs independently of the other antenna pairs, or in yet another embodiment some other scheme for transmitting the reference signal pairs on the antenna pairs may be used.

When using more than one correlated antenna pair, the wireless device may in one embodiment report a separate preferred precoder for each antenna pair, or in an alternative embodiment the wireless device may report the same preferred precoder for all antenna pairs. In the latter example embodiment, which would apply e.g. for an LTE system, the properties of the used precoder set should be controlled such that the beam forming properties are independent between the different antenna pairs (i.e. the precoder set should be reduced to a "symmetric" subset).

Achieved angular information in combination with distance information can then optionally be used to calculate the position of the wireless device. A method performed by a network node for positioning a wireless device in a wireless communication network is also schematically illustrated in FIG. 4. The method comprises the method of finding a direction to a wireless device as described above, and the further step S4 of determining a position of the wireless device based on the direction in combination with distance information. Step S4 is illustrated with dashed lines in FIG. 4 to indicate that it is optional. Distance information may in an embodiment for example be retrieved from RSRP and/or OTDOA information.

U.S. Pat. No. 8,406,787 B2 describes a method for determining a position of a UE based on signal properties of a cellular communication network associated with the UE, and on data representing a precoder selection for spatial multiplexing for the UE.

The proposed method improves the angular accuracy for positioning of a wireless device by introducing a controlled phase difference between the correlated antennas. In one embodiment this may be done e.g. by adding an additional phase on one of the antennas and varying the additional phase in a controlled manner, still considering the same direction to the wireless device. This will cause the beam forming gain in the direction of the wireless device to vary as a function of the added phase. The preferred choice or selection of precoder will also vary with the added phase, since the wireless device will select the precoder which, combined with the added phase difference, corresponds to a beam direction closest to the direction where the wireless device is located. These changes in preferred precoder can be detected, and then the direction to the wireless device can be calculated (in one embodiment assuming e.g. antenna forward direction as reference) based on an analysis of at which values of the added phase the changes between different preferred precoders occur.

The proposed method could in an embodiment be performed in a network node which is associated with or directly controls the correlated antennas, i.e. a node that uses the correlated antennas for transmission, such as e.g. an RBS, such as an eNodeB, or similar. In an alternative embodiment, the method could be performed in a network node which is not associated with or directly controls the correlated antennas, i.e. a node which does not itself use the correlated antennas for transmission, such as e.g. an OAM (Operations, Administration & Maintenance) node.

In a particular embodiment of the proposed method, the network node is a base station and the wireless device is a user equipment (UE).

In an embodiment of the proposed method, the selection of precoder is made by the wireless device from a set of precoders known to both the wireless device and the transmitting network node. The selection is in one embodiment made from measurements on reference signals sent from the transmitting network node without the use of any precoder from the set. That is, in this embodiment the reference signals are not precoded.

In one embodiment, the phase differences of the plurality of reference signal pairs are regularly distributed over the given angular interval. In a particular embodiment, the given angular interval spans 360 degrees and the phase differences of the reference signal pairs are evenly distributed over the given angular interval. In another particular embodiment the phase differences of the reference signal pairs are selected so as to sweep the given angular interval in equal steps.

As described above, a phase dependency of the precoder selection is found by introducing controlled phase differences between the correlated antennas. This may in one embodiment be accomplished e.g. by a controlled phase rotation on antenna 2 over time, e.g. by adding an extra phase shift per ms. The controlled changes of the phase may in other alternative embodiments be performed in any order, and not necessarily in a consecutively increasing manner. Further, in a particular embodiment a code multiplexing scheme may be used, where the phase differences or shifts are generated simultaneously, separated by a code. However, for the understanding of the concept described herein, it may be advantageous to regard the introduction of controlled phase differences between the antennas as a linear increase over time of said phase differences.

Figure 5:
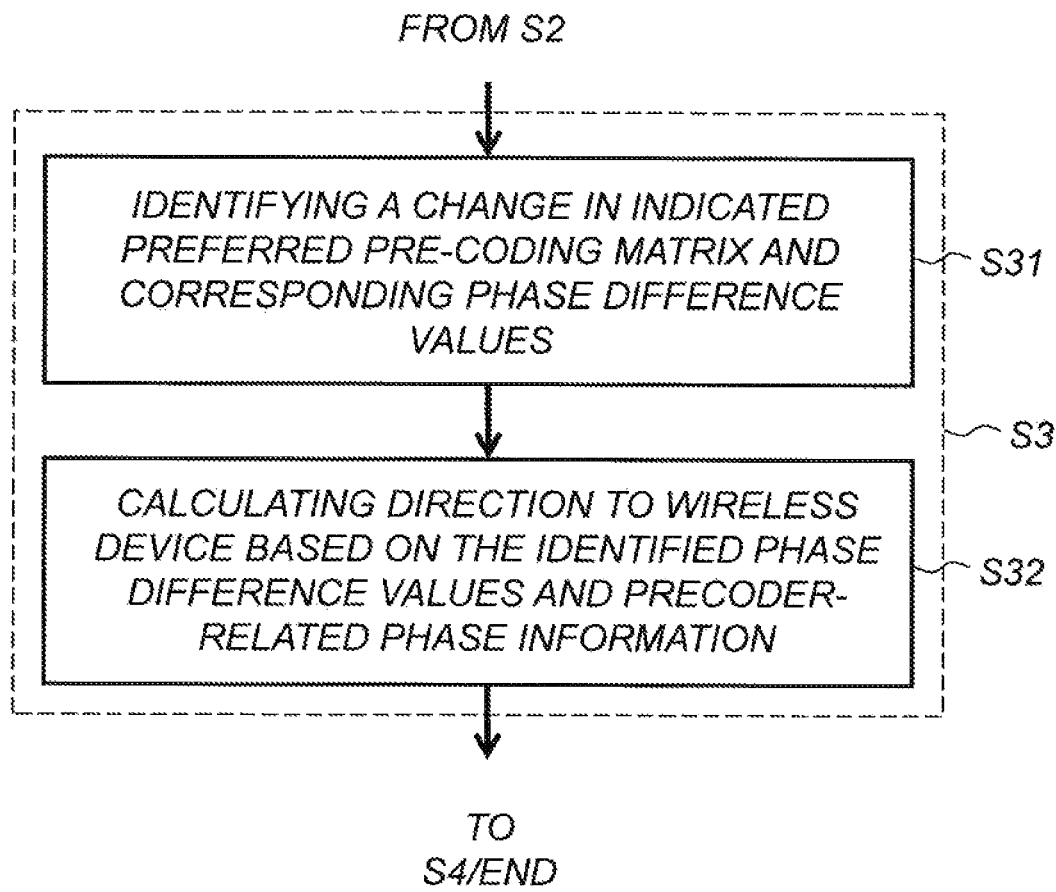
FIG. 5 is a particular example of the determining step of FIG. 4 according to an embodiment.

In a particular embodiment and with reference to FIG. 5, the step S3 of determining a direction to the wireless device comprises the step S31 where the network node identifies, based on the received indications, a change in indicated preferred pre-coding matrix and corresponding phase difference values in the given angular interval between which the change in indicated preferred pre-coding matrix occurred. The step S3 further comprises the step S32 where the network node calculates a direction to the wireless device based on the identified phase difference values and precoder-related phase information related to the preferred pre-coding matrices which were indicated before and after the change occurred. In other words, at a certain value of the phase difference of the transmitted reference signal pairs, the network node in this embodiment detects a change in indicated preferred precoder. Then the network node uses the precoder-related phase information for the precoder that was indicated before the change, and the precoder that was indicated after the change, as well as the phase difference of the reference signal pairs that were transmitted before the change, and the reference signal pairs that were transmitted after the change, to calculate the direction to the wireless device.

The above described particular embodiment can be exemplified as follows:

Assume that a UE is located in a direction D=30 degrees (with reference to FIG. 2). Assume that the distance d between the antennas is half a wavelength, which corresponds to a path difference of ¼ wavelengths (i.e. 90 degrees) from the 5 antennas to the UE.

Also assume that the network node (and the UE) has access to 4 precoders. Each precoder is defined by a specific phase difference between the antennas, as follows (see also FIG. 3):

Precoder 1: 0 degrees phase difference
Precoder 2: 90 degrees phase difference
Precoder 3: −90 degrees phase difference
Precoder 4: 180 (=−180) degrees phase difference Precoder 1 will generate a beam straight forward since the signals will be added constructively in that direction. Precoder 4 will generate a node (minimum) in the forward direction since the signals will cancel each other. Precoder 2 and 3 will generate beams slightly to the right and left, respectively, of the forward direction.

Normally, reference signals are transmitted with the same phase on both antennas. The UE will then in this example experience a phase difference of 90 degrees, due to the direction D (as explained above) and will therefore request precoder 3 (−90 degrees) for transmission of the "useful" data (the precoders are used later when the "useful" information is transmitted). The UE always requests the precoder resulting in a beam direction closest to the direction where the UE is located. This corresponds to the UE trying to select a precoder for which the resulting received phase difference is as close to zero as possible. Thus, the UE will request the precoder which best compensates for the phase difference that is measured for the reference signals.

In this example, if we add a phase difference $f_s$ of 90 degrees between the reference signals to the phase difference of 90 degrees which is due to the direction D, the UE will instead select precoder 4 (−180 degrees) to compensate for the added phase.

Now, if we continue the example by incrementing the phase difference $f_s$ with e.g. 10 degrees every 10 ms, and receive the corresponding report of selected precoder from the UE, we will notice that when jumping from the phase difference $f_s$=40 to $f_s$=50 degrees, the UE will in this example change from reporting precoder 3 to reporting precoder 4. Since we know that the change occurred at an experienced phase difference of 135 degrees (half-way between the values compensated by precoder 3 and 4, respectively, see FIG. 3), we know that this is what the UE has measured and therefore the UE must be located where the experienced phase difference due to the direction D is between 85 and 95 degrees (135-$f_s$), i.e. D is approximately 30 degrees (the distance d between the transmitting antennas is known).

In other words, in a particular example embodiment, each pre-coding matrix represents a specific phase difference between the first and second antenna, and the precoder-related phase information is defined by a phase difference half-way between the specific phase differences represented by the preferred pre-coding matrices which were indicated before and after the change occurred.

The accuracy of the method is improved if the step size of the phase difference incrementation is decreased, however at the cost of an increase in number of steps. In a particular embodiment, the number of pairs of reference signals, and equally the corresponding number of phase differences distributed over the given angular interval, is larger than the number of precoders in the set of predefined precoders. In this particular embodiment, the angular accuracy of the proposed method will be more or less independent of the size of the precoder set.

In another particular embodiment, the step S3 of determining a direction to the wireless device is performed based on information representative of the phase differences of the plurality of reference signal pairs, arranged in a first vector $P_{add}$, and precoder-related phase information representative of differences in phase between the antennas for the indicated preferred pre-coding matrices, arranged in a corresponding second vector $P_{prec}$, wherein a scalar product of the first and second vector is determined as:

$$P = P_{add} \cdot P_{prec}, \text{ and}$$

the direction D of the wireless device in relation to the orientation of the antennas (see FIG. 2), assuming antenna forward direction as a reference, is calculated as:

$$D = \arcsin(v \cdot \lambda / 2\pi \cdot d),$$

where d is the distance between the antennas (see FIG. 2), v is the argument of P and λ is the wavelength.

The above described particular embodiment can be exemplified by the following step-by-step description (valid for one pair of correlated TX antennas):

Add, step-by-step, an extra phase from 0 to 360 degrees, to the transmitted reference signal on antenna 2, preferably in equal steps of e.g. 5 degrees.

For each transmission of reference signal pairs, collect the PMI reported by the UE related to the added phase value on the transmitted signals.

This results in a vector with PMI values where each PMI value corresponds to a specific value of the vector of added phase values.

Replace the vector of added phase values by complex numbers having unit magnitude and the argument equal to the added phase value. Call the new vector $P_{add}$.

Replace the PMI values by complex numbers with unit magnitude and arguments equal to the differences in phase between the antennas (antenna 2–antenna 1) for each PMI value. Call that vector $P_{prec}$.

Calculate the scalar product of the two vectors $P=P_{add} \cdot P_{prec}$. The result is a complex number. Its argument depends on the direction of the UE in relation to the orientation of the two transmit antennas.

The direction is then calculated as $D=\arcsin(v \cdot \lambda/2\pi \cdot d)$ where d is the distance between the transmit antennas, v is the argument of P, and λ is the wavelength (see FIG. 2).

Note that v must be evaluated also for multiples of $2\pi$ as long as the arcsin function produces real value results. E.g. if d=0.7λ and v=0.4·2π then also v=−0.6·2π is relevant and there will be two possible real values of D, D1=arcsin(0.4/0.7) and D2=arcsin(−0.6/0.7).

This means that for d≤λ/2 a single well defined direction will be detected. For λ/2<d≤λ, one or two directions are found. For λ<d≤3λ/2, two or three directions are found, etc. Since the antennas need to be relatively close to each other to be correlated, in practical applications the distance d<λ. This means one or two directions are found.

The ambiguity occurs for UEs further out from the main direction, and for the typical distance d=0.7λ it occurs when the absolute value of D exceeds ~25 degrees. Within ~±35 degrees only one of the values is within the 3-sector span ±60 degrees. In cases with ambiguity the two alternative directions D are at least 90 degrees apart.

In a normal 3-sector system the majority of the UEs will be within ±35 degrees and will get unambiguous results, but the ambiguity for the other users has to be solved by other means.

Figure 6:
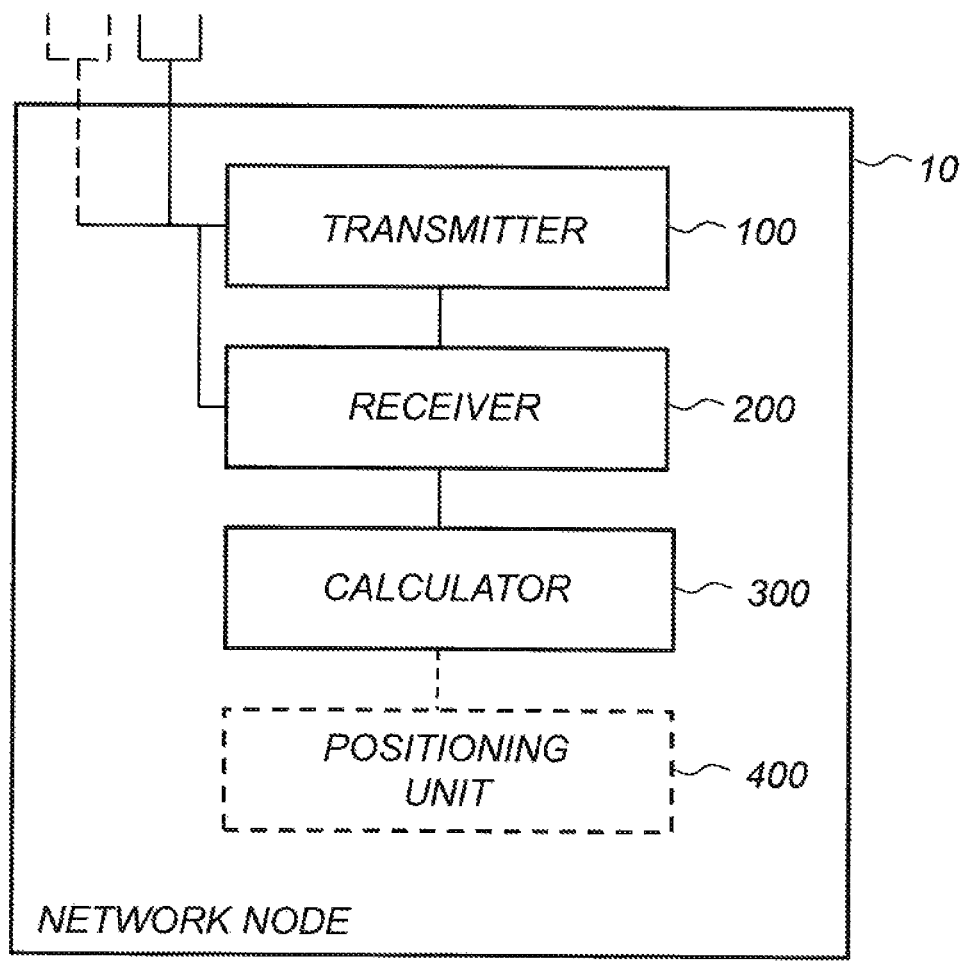
FIG. 6 is a block diagram of an example of a network node according to an embodiment.

As schematically illustrated in FIG. 6, there is also provided a network node 10 configured to find a direction to a wireless device in a wireless communication network. A set of predefined precoders usable by the network node for user communication is known by both the network node and the wireless device, and each precoder is defined by an individual pre-coding matrix. The network node 10 comprises a transmitter 100 configured to transmit a plurality of pairs of reference signals on at least one pair of correlated antennas, each pair of correlated antennas comprising a first and a second antenna, and each pair of reference signals comprising a first and a second reference signal and having its own unique phase difference between the first and the second reference signal. The first reference signal is transmitted on the first antenna and the second reference signal is transmitted on the second antenna, wherein the unique phase differences of the plurality of pairs of reference signals are distributed over a given angular interval The network node illustrated in FIG. 6 further comprises a receiver 200 configured to receive from the wireless device, in response to each pair of reference signals transmitted with its own unique phase difference, a respective indication of a preferred pre-coding matrix.

The network node illustrated in FIG. 6 also comprises a calculator 300 configured to determine a direction to the wireless device based on the received indications, information representative of at least part of the phase differences of the plurality of pairs of reference signals and precoder-related phase information representative of differences in phase between the antennas for at least part of the indicated preferred pre-coding matrices.

In a particular embodiment, the network node 10 is a base station.

The network node 10 may optionally in an embodiment further comprise a positioning unit 400 configured to determine a position of the wireless device based on information representative of the direction determined by the above described calculator 300, in combination with distance information. The positioning unit 400 is illustrated with dashed lines in FIG. 6 to indicate that it is optional. Distance information may in an embodiment for example be retrieved from RSRP and/or OTDOA information.

In a particular embodiment of the network node in FIG. 6, the calculator 300 is configured to identify, based on the received indications, a change in indicated preferred pre-coding matrix and corresponding phase difference values in the given angular interval between which the change in indicated preferred pre-coding matrix occurred. The calculator in this embodiment is further configured to calculate a direction to the wireless device based on the identified phase difference values and precoder-related phase information related to the preferred pre-coding matrices which were indicated before and after the change occurred. In other words, at a certain value of the phase difference of the transmitted reference signal pairs, the calculator in this embodiment detects a change in indicated preferred pre-coder. Then the calculator uses the precoder-related phase information for the precoder that was indicated before the change, and the precoder that was indicated after the change, as well as the phase difference of the reference signal pairs that were transmitted before the change, and the reference signal pairs that were transmitted after the change, to calculate the direction to the wireless device.

In a particular example embodiment of the network node in FIG. 6, each pre-coding matrix represents a specific phase difference between the first and second antenna, and the precoder-related phase information is defined by a phase difference half-way between the specific phase differences represented by the preferred pre-coding matrices which were indicated before and after the change occurred.

In another particular embodiment of the network node in FIG. 6, the calculator 300 is configured to determine a direction to the wireless device based on information representative of the phase differences of the plurality of reference signal pairs arranged in a first vector $P_{add}$, and precoder-related phase information representative of differences in phase between the antennas for the indicated preferred pre-coding matrices arranged in a corresponding second vector $P_{prec}$, wherein the calculator 300 is configured to determine a scalar product of the first and second vector as:

$$P=P_{add} \cdot P_{prec}.$$

In this embodiment, the calculator 300 is further configured to calculate the direction D of the wireless device in relation to the orientation of the antennas, assuming antenna forward direction as a reference, as:

$$D = \arcsin(v \cdot \lambda / 2\pi \cdot d),$$

where d is the distance between the antennas, v is the argument of P and λ is the wavelength.

In one embodiment, the transmitter 100 is configured such that the phase differences of the plurality of reference signal pairs are regularly distributed over the given angular interval. In a particular embodiment, the given angular interval spans 360 degrees and the transmitter 100 is configured such that the phase differences of the plurality of reference signal pairs are evenly distributed over the given angular interval.

In a particular embodiment, the transmitter 100 is configured such that the number of pairs of reference signals, and equally the corresponding number of phase differences distributed over the given angular interval, is larger than the number of precoders in the set of predefined precoders.

Figure 7:
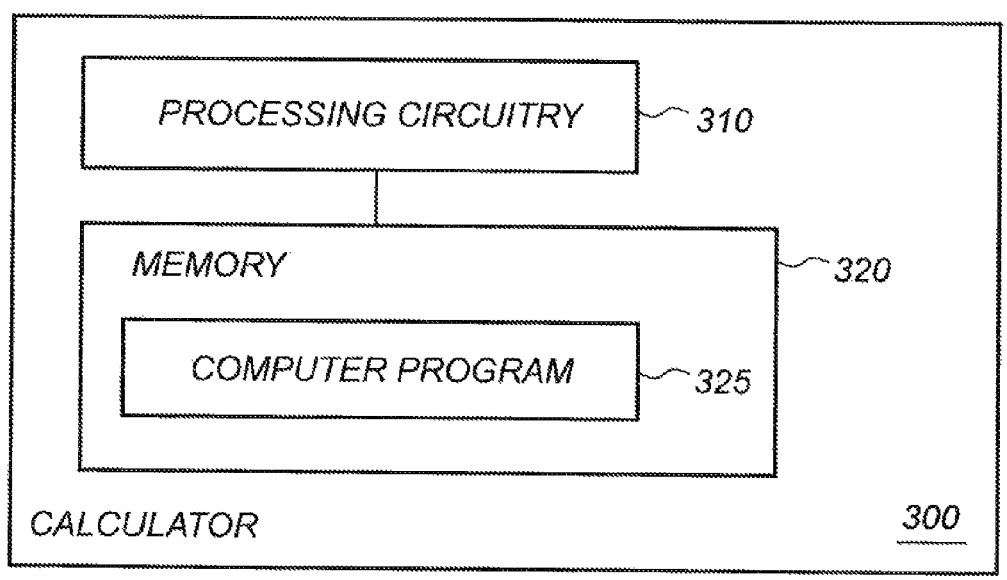
FIG. 7 is a particular example of the calculator of FIG. 6 according to an embodiment.

A particular embodiment of the calculator 300 is illustrated in FIG. 7. In this embodiment the calculator 300 comprises processing circuitry 310 and memory 320, wherein the memory 320 comprises a computer program 325 which when executed by the processing circuitry 310 causes the processing circuitry 310 to determine the direction to the wireless device.

The proposed technology offers one or more of the following advantages:

The disclosed embodiments provide improved accuracy for positioning of wireless devices, with a fast calculation scheme and without impact on the wireless devices.

With the proposed method all data processing are handled in the eNodeB. Thus the method has no impact on the UE whatsoever; no additional signaling and no impact on e.g. UE battery consumption.

UE positioning with the proposed method has the best accuracy close to the serving eNodeB, in contrast to other solutions. This means that UEs can be positioned with sub-cell resolution.

The calculation scheme is fast; typical processing time is below 1 s.

More elaborate solutions including multi-eNodeB processing can further improve positioning performance far from serving eNodeB (i.e. in cell border areas); angle-to-UE from two or more eNodeBs provide a point/area of intersection in which the UE is located.

The proposed method provides a methodology that enables UE positioning in soft cell/non-cellular scenarios where today's CID and E-CID solutions are less capable.

It will be appreciated that the methods and devices described above can be combined and re-arranged in a variety of ways.

For example, embodiments may be implemented in hardware, in software for execution by suitable processing circuitry, or as a combination thereof.

The steps, functions, procedures and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures and/or blocks described above, in particular the calculator, may be implemented in software such as a computer program for execution by suitable processing circuitry including one or more processing units. Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs) or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

For example, the computer program may be stored in memory, which includes program instructions executable by the processing circuitry, whereby the processing circuitry is able or operative to execute the above-described steps, functions, procedure and/or blocks.

The network node is thus configured to perform, when the computer program is executed by the processing circuitry, well-defined processing tasks such as those described above.

The processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a network node for finding a direction to a wireless device in a wireless communication network, a set of predefined precoders usable by the network node for user communication being known by both said network node and said wireless device, each precoder being defined by an individual pre-coding matrix, wherein said method comprises the steps of:

said network node transmitting a plurality of pairs of reference signals on at least one pair of correlated antennas, each pair of correlated antennas comprising a first and a second antenna, and each pair of reference signals comprising a first and a second reference signal and having its own unique phase difference between said first and said second reference signal, said first reference signal being transmitted on said first antenna and said second reference signal being transmitted on said second antenna, wherein the unique phase differences of said plurality of pairs of reference signals are distributed over a given angular interval;

said network node receiving from said wireless device, in response to each pair of reference signals transmitted with its own unique phase difference, a respective indication of a preferred pre-coding matrix; and said network node determining a direction to said wireless device based on the received indications, information representative of at least part of the phase differences of said plurality of pairs of reference signals, and precoder-related phase information representative of differences in phase between the antennas for at least part of the indicated preferred pre-coding matrices, wherein determining the direction to said wireless device comprises:

said network node identifying, based on the received indications, a change in indicated preferred pre-coding matrix and corresponding phase difference values in said given angular interval between which said change in indicated preferred pre-coding matrix occurred; and said network node calculating a direction to said wireless device based on the identified phase difference values and precoder-related phase information related to the preferred pre-coding matrices which were indicated before and after said change occurred.

2. The method of claim 1, wherein each pre-coding matrix represents a specific phase difference between the first and second antenna, and said precoder-related phase information is defined by a phase difference half-way between the specific phase differences represented by the preferred pre-coding matrices which were indicated before and after said change occurred.

3. The method of claim 1, wherein said step of said network node determining a direction to said wireless device is performed based on information representative of the phase differences of said plurality of pairs of reference signals arranged in a first vector Padd, and precoder-related phase information representative of differences in phase between the antennas for the indicated preferred pre-coding matrices arranged in a corresponding second vector Pprec, wherein a scalar product of the first and second vector is determined as:

$$P = P_{add} \cdot P_{prec}, \text{ and}$$

the direction D of the wireless device in relation to the orientation of the antennas, assuming antenna forward direction as a reference, is calculated as:

$$D = \arcsin(v \cdot \lambda / 2\pi d),$$

where d is the distance between the antennas, v is the argument of P and $\lambda$ is the wavelength.

4. The method of claim 1, wherein the phase differences of said plurality of pairs of reference signals are regularly distributed over said given angular interval.

5. The method of claim 4, wherein said given angular interval spans 360 degrees and the phase differences of said plurality of pairs of reference signals are evenly distributed over said given angular interval.

6. The method of claim 4, wherein the phase differences of said plurality of pairs of reference signals are selected so as to sweep said given angular interval in equal steps.

7. The method according to claim 1, wherein the number of pairs of reference signals is larger than the number of precoders in said set of predefined precoders.

8. The method according to claim 1, wherein said network node is a base station and said wireless device is a user equipment.

9. A method performed by a network node for positioning a wireless device in a wireless communication network, wherein said method comprises the method of finding a direction to a wireless device according to claim 1 and the further step of determining a position of said wireless device based on said direction in combination with distance information.

10. A network node configured to find a direction to a wireless device in a wireless communication network, a set of predefined precoders usable by the network node for user communication being known by both said network node and said wireless device, each precoder being defined by an individual pre-coding matrix, wherein said network node comprises:

a transmitter configured to transmit a plurality of pairs of reference signals on at least one pair of correlated antennas, each pair of correlated antennas comprising a first and a second antenna, and each pair of reference signals comprising a first and a second reference signal and having its own unique phase difference between said first and said second reference signal, said first reference signal being transmitted on said first antenna and said second reference signal being transmitted on said second antenna, wherein the unique phase differences of said plurality of pairs of reference signals are distributed over a given angular interval;

a receiver configured to receive from said wireless device, in response to each pair of reference signals transmitted with its own unique phase difference, a respective indication of a preferred pre-coding matrix; and a processor configured to determine a direction to said wireless device based on the received indications, information representative of at least part of the phase differences of said plurality of pairs of reference signals and precoder-related phase information representative of differences in phase between the antennas for at least part of the indicated preferred pre-coding matrices, wherein said processor is further configured to:

identify, based on the received indications, a change in indicated preferred pre-coding matrix and corresponding phase difference values in said given angular interval between which said change in indicated preferred pre-coding matrix occurred, and calculate a direction to said wireless device based on the identified phase difference values and precoder-related phase information related to the preferred pre-coding matrices which were indicated before and after said change occurred.

11. The network node of claim 10, wherein each pre-coding matrix represents a specific phase difference between the first and second antenna, and said precoder-related phase information is defined by a phase difference half-way between the specific phase differences represented by the preferred pre-coding matrices which were indicated before and after said change occurred.

12. The network node of claim 10, wherein said processor is configured to determine a direction to said wireless device based on information representative of the phase differences of said plurality of pairs of reference signals arranged in a first vector Padd, and precoder-related phase information representative of differences in phase between the antennas for the indicated preferred pre-coding matrices arranged in a corresponding second vector Pprec, wherein said processor is configured to determine a scalar product of the first and second vector as:

$$P = P_{add} \cdot P_{prec},$$

and further configured to calculate the direction D of the wireless device in relation to the orientation of the antennas, assuming antenna forward direction as a reference, as:

$$D = \arcsin(v \cdot \lambda / 2\pi \cdot d),$$

where d is the distance between the antennas, v is the argument of P and $\lambda$ is the wavelength.

13. The network node of claim 10, wherein said transmitter is configured such that the phase differences of said plurality of pairs of reference signals are regularly distributed over said given angular interval.

14. The network node of claim 13, wherein said given angular interval spans 360 degrees and said transmitter is configured such that the phase differences of said plurality of pairs of reference signals are evenly distributed over said given angular interval.

15. The network node of claim 10, wherein said transmitter is configured such that the number of pairs of reference signals is larger than the number of precoders in said set of predefined precoders.

16. The network node of claim 10, wherein said processor comprises processing circuitry and memory, wherein said memory comprises a computer program which when executed by said processing circuitry causes the processing circuitry to determine the direction to said wireless device.

17. The network node of claim 10, wherein said network node further comprises a positioning processor configured to determine a position of said wireless device based on information representative of said direction in combination with distance information.

18. The network node of claim 10, wherein said network node is a base station.

* * * * *